(12) United States Patent
Fujiwara

(10) Patent No.: US 8,840,142 B2
(45) Date of Patent: Sep. 23, 2014

(54) VEHICLE OCCUPANT KNEE PROTECTION APPARATUS

(75) Inventor: Yusuke Fujiwara, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/876,230

(22) PCT Filed: Sep. 28, 2011

(86) PCT No.: PCT/IB2011/002251
§ 371 (c)(1),
(2), (4) Date: Apr. 12, 2013

(87) PCT Pub. No.: WO2012/042346
PCT Pub. Date: Apr. 5, 2012

(65) Prior Publication Data
US 2013/0249201 A1    Sep. 26, 2013

(30) Foreign Application Priority Data

Sep. 30, 2010   (JP) ................. 2010-221754

(51) Int. Cl.
*B60R 21/045*    (2006.01)
*B60R 21/00*    (2006.01)

(52) U.S. Cl.
CPC ................ *B60R 21/045* (2013.01);
*B60R 2021/0051* (2013.01)
USPC ............. 280/752; 280/748; 280/751

(58) Field of Classification Search
CPC ............... B60R 21/045; B60R 2021/0051;
B60R 21/02
USPC .......................... 280/748, 751, 752
See application file for complete search history.

(56) References Cited

U.S. PATENT DOCUMENTS

| 6,883,833 | B2 | | 4/2005 | Yamazaki et al. | |
|---|---|---|---|---|---|
| 7,125,045 | B2 | * | 10/2006 | Fuks et al. | 280/748 |
| 7,185,917 | B2 | | 3/2007 | Nagata et al. | |
| 7,290,787 | B2 | | 11/2007 | Hayakawa | |
| 7,354,065 | B2 | | 4/2008 | Muramatsu et al. | |
| 7,431,338 | B2 | * | 10/2008 | Hayata | 280/752 |
| 7,832,764 | B2 | * | 11/2010 | Kawashima et al. | 280/751 |
| 8,128,122 | B2 | * | 3/2012 | Fukawatase et al. | 280/730.1 |
| 8,333,407 | B2 | * | 12/2012 | An | 280/752 |
| 2003/0071448 | A1 | | 4/2003 | Shimoyamada et al. | |
| 2007/0222197 | A1 | | 9/2007 | Makita et al. | |
| 2008/0048425 | A1 | | 2/2008 | Hayata | |
| 2013/0186230 | A1 | * | 7/2013 | Fujiwara | 74/560 |

FOREIGN PATENT DOCUMENTS

| JP | A-2003-220914 | 8/2003 |
|---|---|---|
| JP | A-2003-252162 | 9/2003 |
| JP | A-2004-351957 | 12/2004 |

(Continued)

*Primary Examiner* — Paul N Dickson
*Assistant Examiner* — Joselynn Y Sliteris
(74) *Attorney, Agent, or Firm* — Oliff PLC

(57) ABSTRACT

A vehicle occupant knee protection apparatus is provided in which the front end of an upper bracket is fixed to an instrument panel reinforcement, and a lower bracket and a knee panel are supported by the instrument panel reinforcement via the upper bracket. Thus, the vehicle occupant knee protection apparatus may be attached to the instrument panel reinforcement by, for example, preparing a subassembly by fixing the lower bracket and the knee panel to the upper bracket, and then fixing only the front end of the upper bracket to the instrument panel reinforcement.

5 Claims, 6 Drawing Sheets

(56) References Cited

FOREIGN PATENT DOCUMENTS

| JP | A-2006-62531 | 3/2006 |
| JP | A-2006-341808 | 12/2006 |
| JP | A-2006-341809 | 12/2006 |
| JP | A-2009-40167 | 2/2009 |
| JP | A-2010-825 | 1/2010 |

* cited by examiner

VEHICLE OCCUPANT KNEE PROTECTION APPARATUS

BACKGROUND OF THE INVENTION

1. Field of the Invention

The invention relates to a vehicle occupant knee protection apparatus for protecting the knees of an occupant upon a collision of the vehicle.

2. Description of Related Art

Japanese Patent Application Publication No. 2006-062531 describes a vehicle knee bolster structure in which the lower rear ends of left and right upper panel members (upper brackets), which are paired, and the lower rear ends of left and right lower panel members (lower brackets), which are paired, are overlapped and welded to each other. The upper front ends of the respective upper and lower panel members are separately welded to an instrument panel reinforcement, which is a pipe member, and a sheet metal panel (knee panel) is welded to lower panel portions of the respective upper panel members. Further, multiple bend portions and notches are provided at an upper panel portion of each upper panel member. According to this structure, as the knees of an occupant hit against the knee bolster, the upper panel portions of the respective upper panel members largely deform at the bend portions and notches, absorbing the impact load.

Achieving a high occupant knee protection performance of such a knee bolster structure (vehicle occupant knee protection apparatus) requires that the rear end sides of the respective upper panel members be positioned accurately as designed, with respect to the knees of the occupant. To this end, it is necessary to accurately attach (weld) the upper panel members to the instrument panel reinforcement, which is often a pipe member.

According to the knee bolster structure described above, however, both of the upper panel member (upper bracket) and the lower panel member (lower bracket), which are welded to each other, need to be welded to the instrument panel reinforcement that is a pipe member. Therefore, an error(s) in attaching the lower bracket to the instrument panel reinforcement, a dimensional error(s) of the lower bracket, and so on, affect the location of the rear end side of the upper bracket, and thus it is difficult to ensure a sufficient accuracy in attaching each upper bracket to the instrument panel reinforcement.

SUMMARY OF THE INVENTION

The invention provides a vehicle occupant knee protection apparatus with which a high accuracy in attaching an upper bracket to an instrument panel reinforcement is easily achieved.

The first aspect of the invention relates to a vehicle occupant knee protection apparatus, having: a knee panel to which load is input from a knee of an occupant upon a collision of a vehicle; a lower bracket of which a lower end is fixed to a lower end portion of the knee panel; and an upper bracket of which a rear end is fixed to an upper end portion of the knee panel and at which multiple creases that are to be bent in response to the load being input are provided in a longitudinal row, wherein an upper end of the lower bracket is fixed to a front end portion of the upper bracket and the front end of the upper bracket is fixed to an instrument panel reinforcement.

According to the vehicle occupant knee protection apparatus of the first aspect of the invention, the front end of the upper bracket is fixed to the instrument panel reinforcement, the upper end of the lower bracket is fixed to the front end portion portion of the upper bracket, the knee panel is fixed to the lower end of the lower bracket and the rear end of the upper bracket, and the upper bracket has the multiple creases arranged in a longitudinal low. Thus, when the knees of the occupant hit against the knee panel upon a collision of the vehicle, the upper bracket bends at the multiple creases and thereby absorbs the impact on the knees, protecting the knees of the occupant.

In the vehicle occupant knee protection apparatus of the first aspect of the invention, as described above, since the upper end of the lower bracket is fixed to the front end portion of the upper bracket and the front end of the upper bracket is fixed to the instrument panel reinforcement, the vehicle occupant knee protection apparatus may be attached to the instrument panel reinforcement by, for example, preparing a subassembly by fixing the lower bracket and the knee panel to the upper bracket, and then fixing (e.g., welding) the front end of the upper bracket to the instrument panel reinforcement. As such, the upper bracket, which makes a vital role to achieve a high occupant knee protection performance, can be easily, and accurately, attached to the instrument panel reinforcement.

The vehicle occupant knee protection apparatus of the first aspect of the invention may further have a knee airbag module that is arranged near a portion, at a side where the lower bracket is present, of the knee panel and that is fixed to the knee panel or to the lower bracket.

According to this structure, the knee airbag module is arranged near the lower bracket side portion of the knee panel and is fixed to the knee panel or to the lower bracket. Since the lower bracket is not made to be fragile or weak by providing creases, such as the upper bracket, the lower bracket can properly bear the reactive force that occurs during deployment of the knee airbag.

Further, the vehicle occupant knee protection apparatus described above may be such that an attachment portion of the knee airbag module via which the knee airbag module is fixed to the knee panel is located higher than the lower end of the lower bracket, and another attachment portion of the knee airbag module via which the knee airbag module is fixed to the knee panel is located lower than the lower end of the lower bracket.

According to this structure, the bending moment exerted on the lower bracket by the reactive force input from the deploying knee airbag via the higher attachment portion and the bending moment exerted on the lower bracket by the reactive force input from the deploying knee airbag via the lower attachment portion cancel each other out. Thus, the total bending moment exerted on the lower bracket is small, allowing the rigidity of the lower bracket to be lowered. As such, it is possible to reduce the weight of the lower bracket.

Further, the vehicle occupant knee protection apparatus described above may be such that the multiple creases are arranged to be longitudinally adjacent to each other such that one of the creases is located above a normal to the knee panel drawn through a longitudinal center of a portion to which the upper bracket is fixed, while the other is located below the normal.

According to this structure, when the knees of the occupant hit against the knee panel, load is input to the upper bracket via the attachment portion of the knee panel via which it is fixed to the upper bracket. Since the upper bracket has the multiple creases arranged in a longitudinal row such that one of the creases is located above the normal to the knee panel drawn through the longitudinal center of the portion to which the upper bracket is fixed, while the other is located below the normal, the respective creases bend upward and downward so as to move away from each other, whereby the upper bracket bends into a Z-like form or into a zigzag form. Thus, the distance over which the upper bracket can deform at maximum is large.

Further, the vehicle occupant knee protection apparatus described above may be such that: the multiple creases include a first crease and a second crease that is closer to the instrument panel reinforcement than the first crease is; and a section modulus of the upper bracket gradually decreases from a knee panel side end toward the first crease, and gradually decreases from an instrument panel reinforcement side end toward the second crease.

According to this structure, when the load on the knees of the occupant is input to the upper bracket, the first and second creases bend upward and downward, respectively, so as to move away form each other, whereby the upper bracket bends into a Z-like form. Since the section modulus of the upper bracket gradually decreases from the knee panel side end toward the first crease and gradually decreases from the instrument panel side end toward the second crease, stress can be desirably concentrated on the first and second creases when the load is input, and the parts of the upper bracket that are not necessary for stress transfer ("useless parts" or "waste parts") can be removed. Thus, the upper bracket can be effectively given "multi-stage bending characteristic" while minimizing or avoiding an increase in the mass of the upper bracket.

Accordingly, the vehicle occupant knee protection apparatus of the first aspect of the invention makes it easy to accurately attach the upper bracket to the instrument panel reinforcement.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
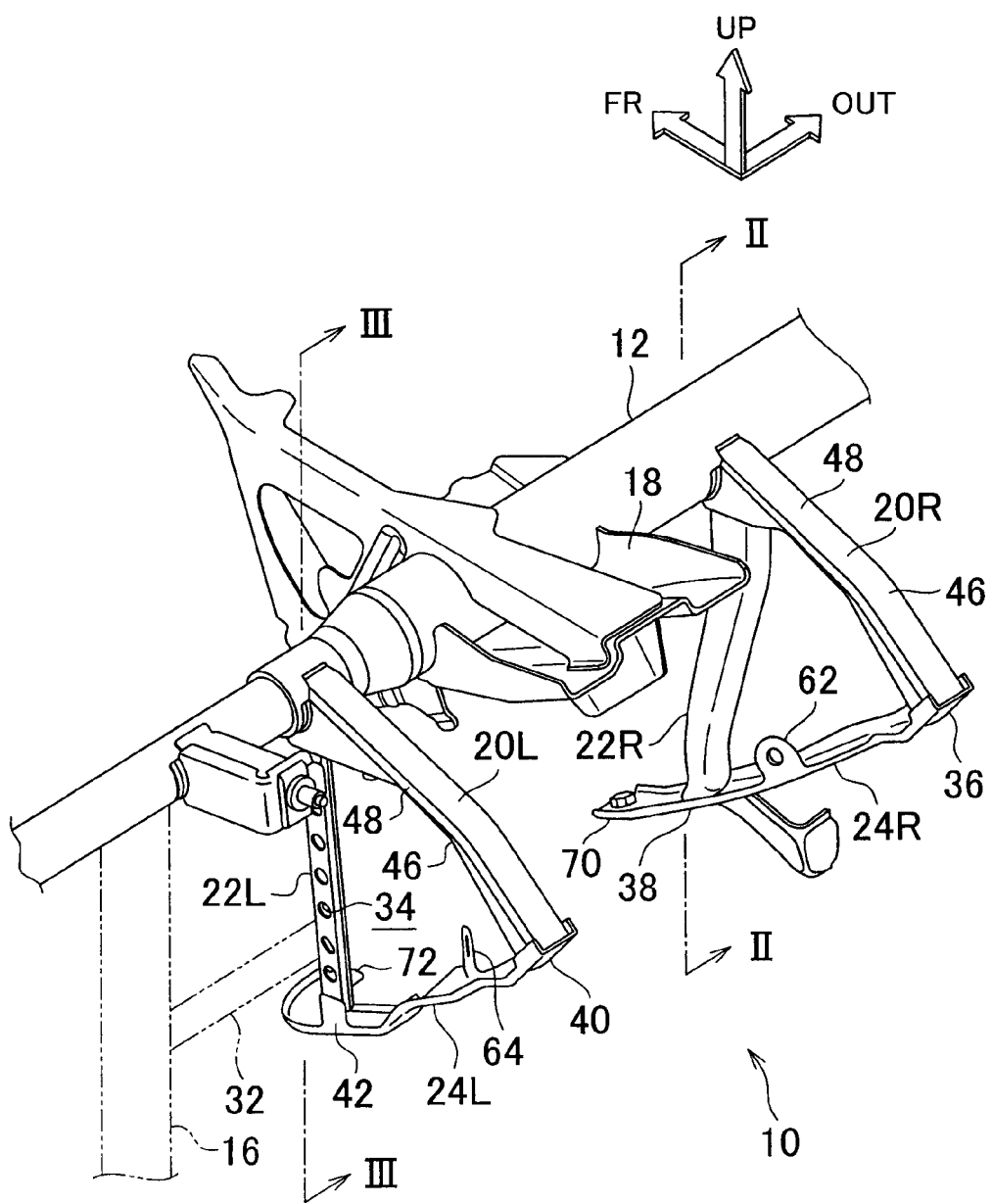
FIG. 1 is a perspective view showing the structure of a vehicle occupant knee protection apparatus of the first example embodiment of the invention, together with its peripheral structures.

A vehicle occupant knee protection apparatus 10 of the first example embodiment of the invention will hereinafter be described with reference to FIGS. 1 to 9. In the drawings, the arrow FR points at the front side of the vehicle, the arrow UP points at the upper side of the vehicle, and the arrow OUT points at the laterally outer side of the vehicle.

Figure 2:
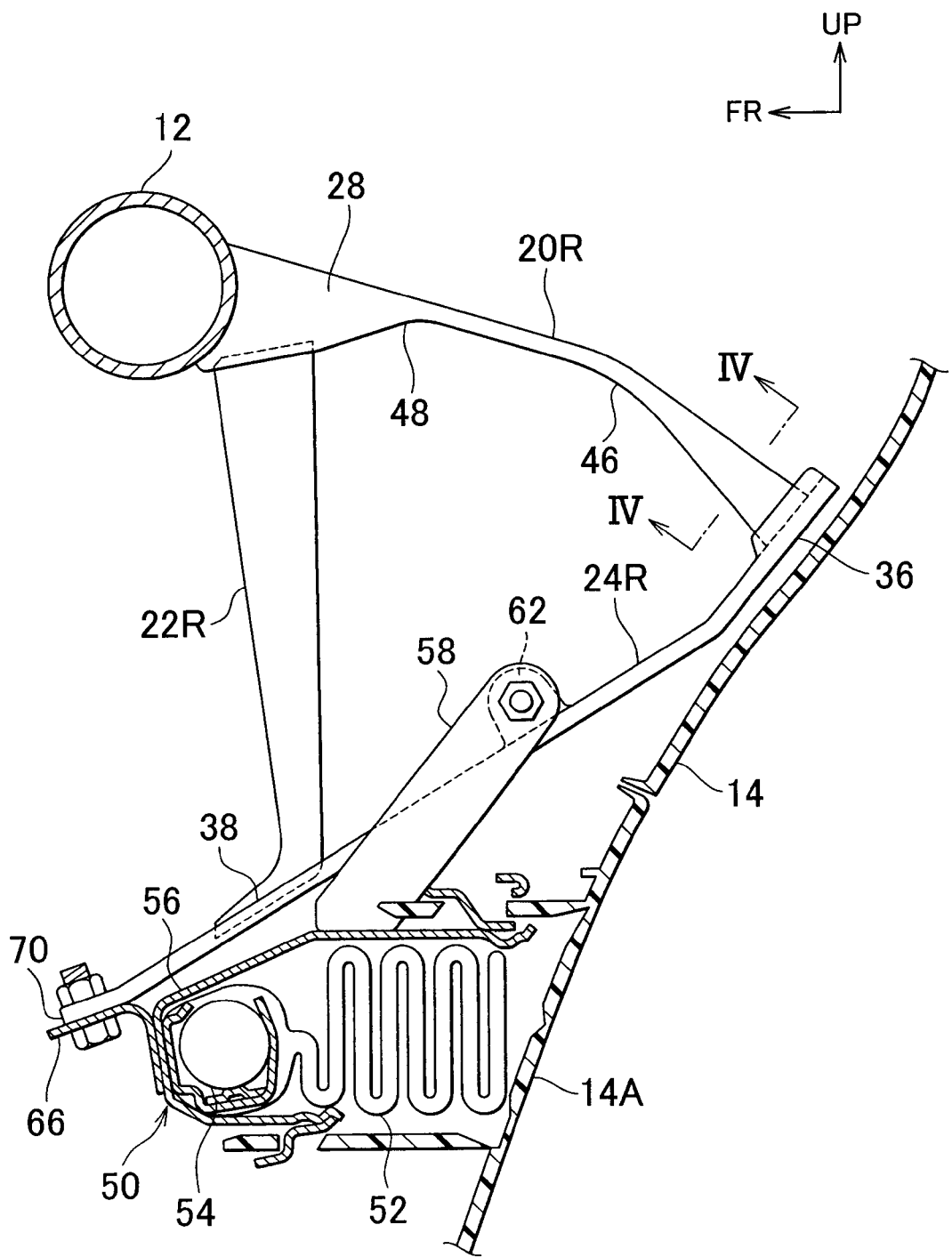
FIG. 2 is an enlarged sectional view taken along the direction indicated by the arrows 2 in FIG. 1.
Figure 3:
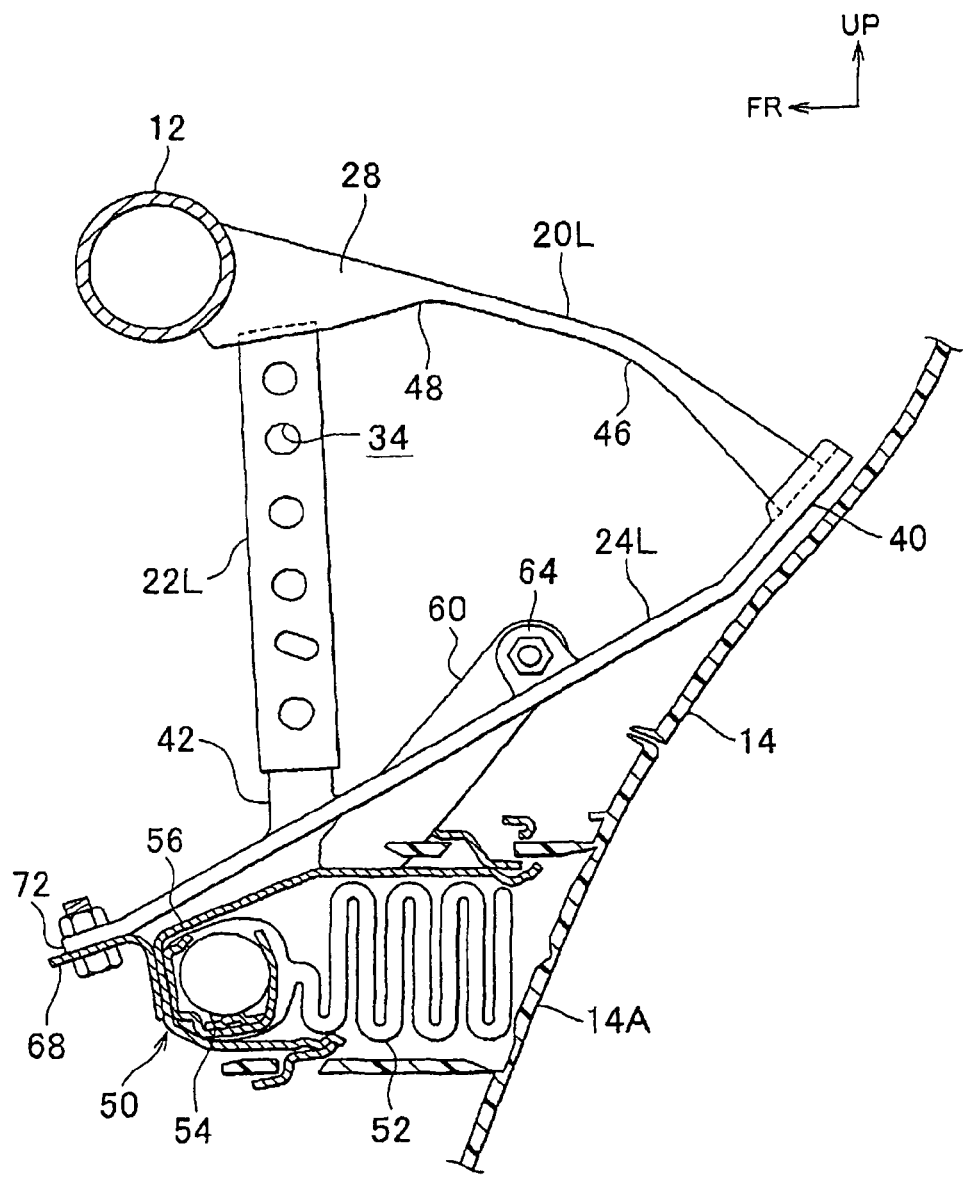
FIG. 3 is an enlarged sectional view taken along the direction indicated by the arrows 3 in FIG. 1.

The vehicle occupant knee protection apparatus 10 of the first example embodiment is a protection apparatus for protecting the knees of an occupant seated on the driver's seat of the vehicle that is a right-hand vehicle. Referring to FIGS. 1 to 3, the vehicle occupant knee protection apparatus 10 is attached on an instrument panel reinforcement 12. The instrument panel reinforcement 12 is arranged on the inner side of an instrument panel 14 provided at the front of the vehicle compartment, and left and right vehicle body panels are connected to each other via the instrument panel reinforcement 12 extending in the lateral direction of the vehicle (note that FIG. 1 shows only a part of the instrument panel reinforcement 12).

The instrument panel reinforcement 12 is a long metal pipe member formed to be thick at a driver's seat side portion that is required of a high strength and to be thin at a passenger seat side portion that is not required of such a high strength. The upper end of a floor brace 16 is fixed to the longitudinally center portion of the instrument panel reinforcement 12, while the lower end of the floor brace 16 is fixed on a floor panel. A column bracket 18 used for attachment of a steering column is attached on the driver's seat side portion of the instrument panel reinforcement 12. A right upper bracket 20R, a right lower bracket 22R, and a right knee panel 24R, which constitute the vehicle occupant knee protection apparatus 10, are provided on the right side of the column bracket 18, while a left upper bracket 20L, a left lower bracket 22L, and a left knee panel 24L, which also constitute the vehicle occupant knee protection apparatus 10, are provided on the left side of the column bracket 18.

Figure 4:
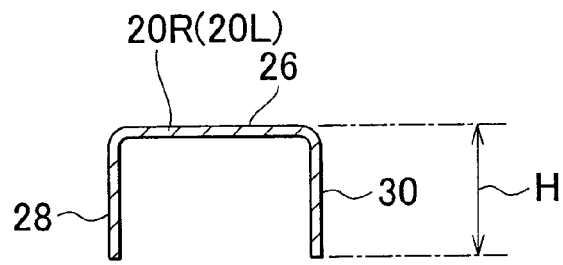
FIG. 4 is an enlarged sectional view taken along the direction indicated by the arrows 4 in FIG. 2.
Figure 5:
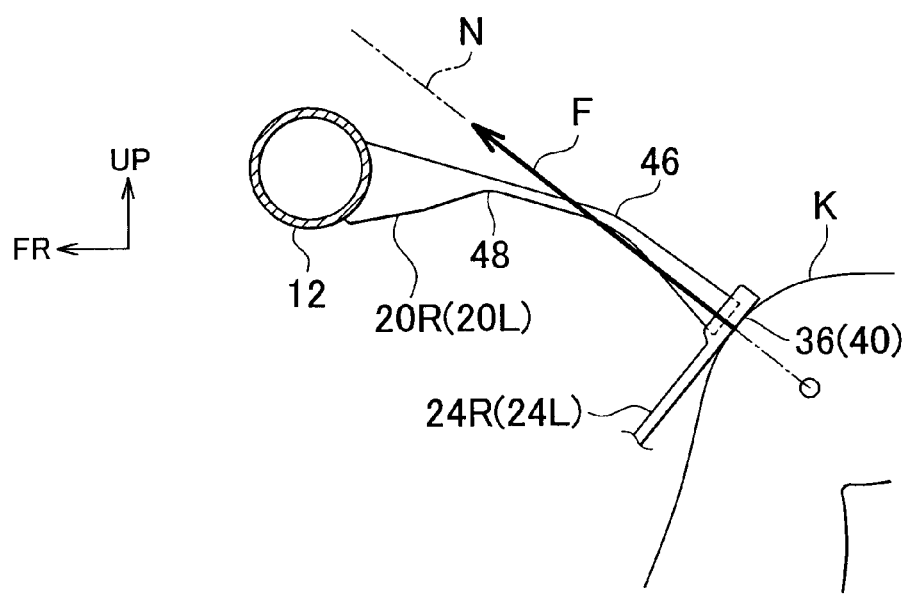
FIG. 5 is a view illustrating how impact load is input to an upper bracket.
Figure 6:
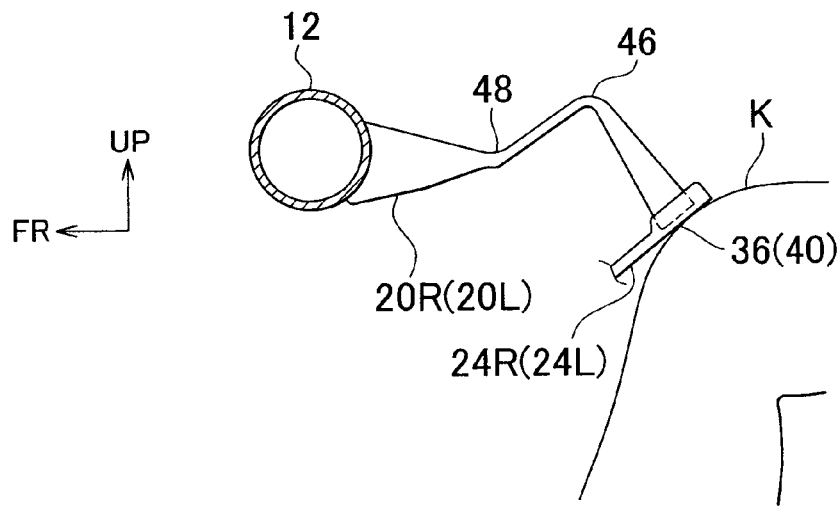
FIG. 6 is a view illustrating how the upper bracket bends.

The right upper bracket 20R and the left upper bracket 20L are each made from an elongated metal plate. They are each fixed, by welding, at a longitudinal end (front end) to the instrument panel reinforcement 12 and extend toward the rear of the vehicle from the instrument panel reinforcement 12. Referring to FIG. 4, the upper brackets 20R and 20L are each generally U-shaped in section, opening downward and having an upper wall 26 and perpendicular walls 28 and 30 that extend downward from the left and right edges of the upper wall 26, respectively.

The right lower bracket 22R and the left lower bracket 22L are each made from an elongated metal plate and are located lower than the instrument panel reinforcement 12. The right lower bracket 22R is made from a metal plate thicker than the metal plate from which the right upper bracket 20R is made, and is generally U-shaped in section such that its opening is opposed to the front of the vehicle, thus making the right lower bracket 22R higher in rigidity than the upper brackets 20R and 20L. The right lower bracket 22R is fixed, by welding, at its upper end to a front end portion of the right upper bracket 20R, and extends downward from the right upper bracket 20R.

On the other hand, the left lower bracket 22L, provided on the left side, is fixed, by welding, at its upper end to a front end portion of the left upper bracket 20L and extends downward from the left upper bracket 20L. Referring to FIG. 1, the left lower bracket 22L is connected to the floor brace 16 via a connection bracket 32 and thus is supported (reinforced) by the floor brace 16. Therefore, the left lower bracket 22L is formed harder to deform under impact loads acting in the longitudinal direction of the vehicle than the upper brackets 20R and 20L, while the left lower bracket 22L is made, as a whole, thinner than the right lower bracket 22R and has a plurality of through holes 34, for weight reduction.

The right knee panel 24R and the left knee panel 24L are each made from an elongated metal plate. The right knee panel 24R is arranged, with respect to the right upper bracket 20R and the right lower bracket 22R, on the side opposite from where the instrument panel reinforcement 12 is present. Likewise, the left knee panel 24L is arranged, with respect to the left upper bracket 20L and the left lower bracket 22L, on the side opposite from where the instrument panel reinforcement 12 is present. The right knee panel 24R is fixed, by welding, to the rear end of the right upper bracket 20R via an upper attachment portion 36 provided at the upper end portion of the right knee panel 24R, and is fixed, by welding, to the lower end of the right lower bracket 22R via a lower attachment portion 38 provided at (or near) the lower end of the right knee panel 24R. On the other hand, the left knee panel 24L is fixed, by welding, to the rear end of the left upper bracket 20L via an upper attachment portion 40 provided at the upper end of the left knee panel 24L, and is fixed, by welding, to the lower end of the left lower bracket 22L via a lower attachment portion 42 provided at the lower end portion of the left knee panel 24L.

The knee panels 24R and 24L are positioned to be opposed, from the front side of the vehicle, to the respective knees of the occupant seated on the driver's seat. More specifically, if the occupant seated on the driver's seat is of an average build or of a build larger than the average build (e.g., a build corresponding to AM50 (50th-percentile American adult male)), upper end portions of the respective knee panels 24R and 24L (the respective upper attachment portions 40 and 36) are opposed, from the front side of the vehicle, to the respective knees of the occupant. In contrast, if the occupant seated on the driver's seat is of a build smaller than the average build (e.g., a build corresponding to AF05 (5th-percentile American adult female)), vertically intermediate portions of the respective knee panels 24R and 24L are opposed, from the front side of the vehicle, to the respective knees of the occupant.

Referring to FIGS. 2 and 3, in the vehicle occupant knee protection apparatus 10, the upper brackets 20R and 20L each have a first crease 46 and a second crease 48, which are fragile or weak portions provided at respective longitudinally intermediate portions of the upper bracket. The first crease 46 and the second crease 48 are arranged in a longitudinal row such that the second crease 48 is located closer to the instrument panel reinforcement 12 than the first crease 46 is.

The perpendicular length of the right upper bracket 20R (a height H of the perpendicular walls 28 and 30, the section modulus) gradually decreases toward the first crease 46 from the right knee panel 24R side end, and the perpendicular length of the left upper bracket 20L (the height H of the perpendicular walls 28 and 30, the section modulus) gradually decreases toward the first crease 46 from the left knee panel 24L side end. The perpendicular length of the right upper bracket 20R (the height H of the perpendicular walls 28 and 30, the section modulus) is constant between the first crease 46 and the second crease 48, and the perpendicular length of the portion of the right upper bracket 20R between the first crease 46 and the second crease 48 is smaller than that of the portion extending rearward from the first crease 46 and that of the portion extending forward from the second crease 48. Likewise, the perpendicular length of the left upper bracket 20L (the height H of the perpendicular walls 28 and 30, the section modulus) is constant between the first crease 46 and the second crease 48, and the perpendicular length of the portion of the left upper bracket 20L between the first crease 46 and the second crease 48 is smaller than that of the portion extending rearward from the first crease 46 and that of the portion extending forward from the second crease 48. Further, the perpendicular length of the right upper bracket 20R (the height H of the perpendicular walls 28 and 30, the section modulus) gradually decreases toward the second crease 48 from the instrument panel reinforcement 12 side end, and the perpendicular length of the left upper bracket 20L (the height H of the perpendicular walls 28 and 30, the section modulus) gradually decreases toward the second crease 48 from the instrument panel reinforcement 12 side end.

Due to the structure described above, referring to FIG. 5, when impact load F acts, toward the front of the vehicle, on the rear ends of the respective upper brackets 20R and 20L via the right knee panel 24R and the left knee panel 24L, respectively, as knees K of the occupant hit against the respective knee panels 24R and 24L during a collision of the vehicle, stress concentrates on the first creases 46 and the second creases 48.

In the first example embodiment, further, the upper brackets 20R and 20L are each curved slightly at the first crease 46 such that the first crease 46 is located above a normal N to the right knee panel 24R (the left knee panel 24L) at the longitudinal center (i.e., vertical center) of the upper attachment portion 36 (the upper attachment portion 40) (note that the normal N corresponds to the direction the impact load F is input) and the second crease 48 is located below the normal N. That is, at each upper bracket, multiple creases are arranged to be longitudinally adjacent to each other such that one of them is above the normal N while the other is below it.

In the first example embodiment, further, referring to FIGS. 2 and 3, a knee airbag module 50 (not shown in FIG. 1) is arranged near the lower bracket 22R side portion of the right knee panel 24R and the lower bracket 22L side portion of the left knee panel 24L (in this embodiment, the knee airbag module 50 is arranged on the lower side of the lower brackets 22R and 22L). The knee airbag module 50 is provided with a knee airbag 52 that, when inflated and deployed, raptures a lower portion 14A of the instrument panel 14 and then deploys toward the front of the knees of the occupant, an inflator 54 that feeds gas to the knee airbag 52 upon a collision of the vehicle, and a metallic module case 56 that houses the knee airbag 52 and the inflator 54.

Right and left fastening members 58 and 60, which are paired, are provided at a vehicle longitudinal direction intermediate portion of the module case 56, and they extend obliquely upward into the rear side of the vehicle. The right fastening member 58 is fixedly fastened, using a bolt and a nut, to a fastening portion 62 provided at a vertically intermediate portion (i.e., a portion between the upper attachment portion 36 and the lower attachment portion 38) of the right knee panel 24R, while the left fastening member 60 is fixedly fastened, using a bolt and a nut, to a fastening portion 64 provided at a vertically intermediate portion (i.e., a portion between the upper attachment portion 40 and the lower attachment portion 42) of the left knee panel 24L.

On the other hand, right and left fastening members 66 and 68, which are paired, are provided at the front end of the module case 56, and they extend toward the front of the vehicle. The right fastening member 66 is fixedly fastened, using a bolt and a nut, to a fastening portion 70 provided at the lower end (front end) of the right knee panel 24R, and the left fastening member 68 is fixedly fastened, using a bolt and a nut, to a fastening portion 72 provided at the lower end (front end) of the left knee panel 24L.

Structured as described above, the knee airbag module 50 is fixedly fastened to the knee panels 24R and 24L at the four points, that is, the two fastening portions 62 and 64 arranged higher than the lower ends of the respective lower brackets 22R and 22L and another two fastening portions 70 and 72 arranged lower than the same lower ends.

The vehicle occupant knee protection apparatus 10, structured as described above, is fixed to the instrument panel reinforcement 12 by the front ends of the respective upper brackets 20R and 20L being fixed to the instrument panel reinforcement 12, and the lower brackets 22R and 22L, the knee panels 24R and 24L, and the knee airbag module 50 are supported by the instrument panel reinforcement 12 via the upper brackets 20R and 20L.

Next, the effects and advantages of the first example embodiment will be described.

According to the vehicle occupant knee protection apparatus 10 structured as described above, upon a collision of the vehicle, the knee airbag 52 is inflated to deploy toward the knees K of the occupant and thus absorbs (receives) the impact load on the knees K of the occupant. Then, the residual impact load (the impact load that could not be absorbed by the knee airbag 52) on the knees K is absorbed by the upper brackets 20R and 20L bending at the respective first creases 46 and second creases 48, provided in front of the knees of the occupant, if the occupant is of the average build or a build larger than the average build (refer to FIG. 6), or is absorbed by the knee panels 24R and 24L, provided in front of the knees of the occupant, deforming if the occupant is of a build smaller than the average build. In this way, the knees of the occupant are protected from the impact that occurs during the vehicle collision.

According to the vehicle occupant knee protection apparatus 10, further, as described above, the upper ends of the respective lower brackets 22R and 22L are fixed, respectively, to the front end portions of the respective upper brackets 20R and 20L, and the front ends of the respective upper brackets 20R and 20L are fixed to the instrument panel reinforcement 12. Thus, the vehicle occupant knee protection apparatus 10 can be fixed to the instrument panel reinforcement 12 by preparing sub-assemblies by fixing the right lower bracket 22R and the right knee panel 24R to the right upper bracket 20R and fixing the left lower bracket 22L and the left knee panel 24L to the left upper bracket 20L, and then fixing (welding) the front ends of the respective upper brackets 20R and 20L to the instrument panel reinforcement 12. As such, the upper brackets 20R and 20L, which make a vital role to achieve a high occupant knee protection performance, can be easily, and accurately, attached to the instrument panel reinforcement 12.

According to the vehicle occupant knee protection apparatus 10, further, as described above, the knee airbag module 50 is arranged near the right lower bracket 22R side portion of the right knee panel 24R and the left lower bracket 22L side portion of the left knee panel 24L and is fixed to the knee panels 24R and 24L, and the right lower bracket 22R is higher in rigidity than the upper brackets 20R and 20L, and the left lower bracket 22L is supported by the floor brace 16 via the connection bracket 32 and thus is harder to deform under impact loads acting in the longitudinal direction of the vehicle than the upper brackets 20R and 20L are. Thus, the lower brackets 22R and 22L can properly bear the reactive force from the knee airbag 52 during its deployment, minimizing the possibility of the module case 56 being forced to move by the reactive force from the deploying knee airbag 52 or suppressing such movement of the module case 56, and thus ensuring a stable deployment direction of the knee airbag 52. As such, a higher occupant knee protection performance can be achieved using the knee airbag.

According to the vehicle occupant knee protection apparatus 10, further, as described above, the attachment portions of the knee airbag module 50 via which it is fixed to the right knee panel 24R and the left knee panel 24L, respectively, include those located higher than the lower ends of the respective lower brackets 22R and 22L and those located lower than the same lower ends. Therefore, the bending moment exerted on the lower brackets 22R and 22L by the reactive force input from the deploying knee airbag 52 via the respective upper attachment portions (the respective fastening portions 62 and 64) and the bending moment exerted on the lower brackets 22R and 22L by the reactive force input from the deploying knee airbag 52 via the respective lower attachment portions (the respective fastening portions 70 and 72) cancel each other out. Thus, the total bending moment exerted on the lower brackets 22R and 22L is small, allowing the rigidities of the respective lower brackets 22R and 22L to be lowered. As such, it is possible to reduce the weights of the respective lower brackets 22R and 22L.

According to the vehicle occupant knee protection apparatus 10, further, as described above, the first crease 46 of the right upper bracket 20R (the left upper bracket 20L) is located above the normal N to the right knee panel 24R (the left knee panel 24L) at the longitudinal center of the upper attachment portion 36 (the upper attachment portion 40) to which the right upper bracket 20R (the left upper bracket 20L) is fixed, while the second crease 48 is located below it. Therefore, when the impact load F is input to the rear ends of the respective upper bracket 20R and 20L via the right knee panel 24R and left knee panel 24L, respectively, each first crease 46 bends upward so as to move away from the normal N and each second crease 48 bends downward so as to move away from the normal N, so that the upper brackets 20R and 20L each bend into a Z-like form. Thus, the distances over which the respective upper brackets 20R and 20L can deform at maximum (i.e., the maximum amounts by which the respective upper attachment portions 36 and 40 can move relative to the vehicle body) are large.

Figure 7:
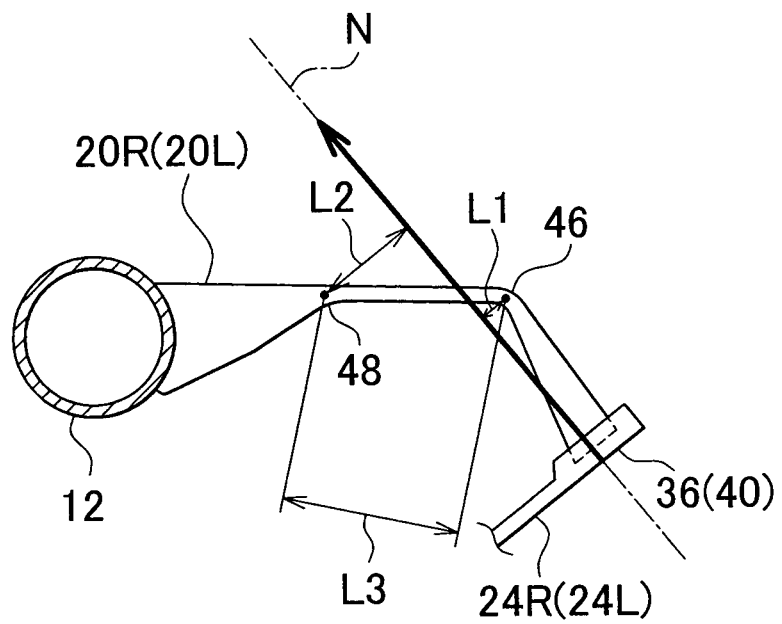
FIG. 7 is a view illustrating an impact load input vector and the distance between a first crease and a second crease.
Figure 8:
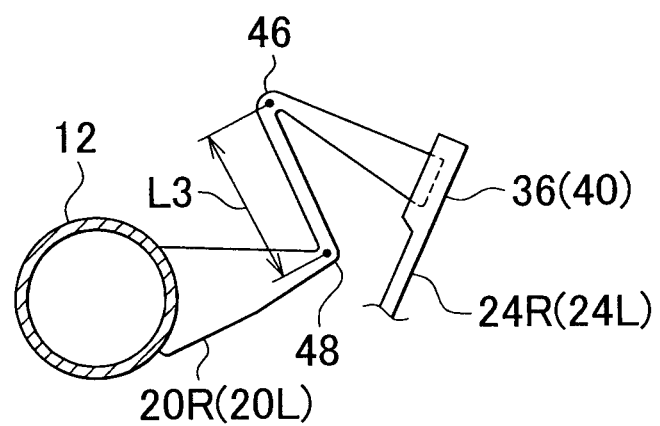
FIG. 8 is a view showing a state where the upper bracket has deformed to its deformation limit.

According to the vehicle occupant knee protection apparatus 10, further, referring to FIG. 7, the impact load (reactive force) to be exerted on the thighs of the occupant can be freely, and finely, adjusted by changing a distance L1 from the neutral line of the section of the first crease 46 to the normal N (the input vector of the impact load F) and a distance L2 from the neutral line of the section of the second crease 48 to the normal N (the input vector of the impact load F). Further, the distances over which the respective upper brackets 20R and 20L can deform at maximum, that is, the deformation limits beyond which the respective upper brackets 20R and 20L can not deform (i.e., the movement limits of the respective upper attachment portions 36 and 40) can be freely, and finely, adjusted by changing a length L3 between the first crease 46 and the second crease 48 of each of the upper brackets 20R and 20L. As such, the setting for minimizing the possibility of the respective upper brackets 20R and 20L deforming to their deformation limits (refer to FIG. 8) is easy.

According to the vehicle occupant knee protection apparatus 10, further, as described above, the perpendicular length (the height H of the perpendicular walls 28 and 30) of the right upper bracket 20R (the left upper bracket 20L) gradually decreases from the right knee panel 24R side end (the left knee panel 24L side end) toward the first crease 46 and gradually decreases from the instrument panel reinforcement 12 side end toward the second crease 48. Thus, stress can be desirably concentrated on the first crease 46 and the second crease 48 when impact load is input to the right upper bracket 20R (the left upper bracket 20L). Further, the parts of the upper brackets 20R and 20L that are not necessary for stress transfer ("useless parts" or "waste parts") can be removed, and therefore the upper brackets 20R and 20L can be effectively given "multi-stage bending characteristic" while minimizing or avoiding an increase in the masses of the respective upper brackets 20R and 20L.

According to the vehicle occupant knee protection apparatus 10, further, as described above, the height H of the perpendicular walls 28 and 30, which is greatly influential on the section modulus, varies in the longitudinal direction of the upper brackets 20R and 20L. Therefore, the minimization or avoidance of an increase in the mass of each upper bracket and the desired stress concentration on each crease can be easily accomplished at the same time, as compared to, for example, a case where the lateral length of each upper bracket varies. Further, if notches, or the like, were formed at the first crease 46 and the second crease 48, stress would concentrate on the notches, resulting in a small amount of energy that each upper bracket can absorb at maximum. In this respect, since the first creases 46 and the second creases 48 are all free of notches, or the like, the upper brackets 20R and 20L can each absorb a large amount of energy.

According to the vehicle occupant knee protection apparatus 10, further, as described above, the perpendicular length of the right upper bracket 20R (the left upper bracket 20L) gradually increases from the first crease 46 toward the right knee panel 24R (the left knee panel 24L). Therefore, the perpendicular length of the right upper bracket 20R (the left upper bracket 20L) can be made large at where the right upper bracket 20R (the left upper bracket 20L) is welded to the right knee panel 24R (the left knee panel 24L), that is, at the rear end of the right upper bracket 20R (the left upper bracket 20L). As such, even if the knees K of the occupant are somewhat offset vertically from the rear ends of the respective upper brackets 20R and 20L, the impact load F can be properly input to the rear ends of the respective upper brackets 20R and 20L, enabling the upper brackets 20R and 20L to deform as intended in design.

Figure 9:
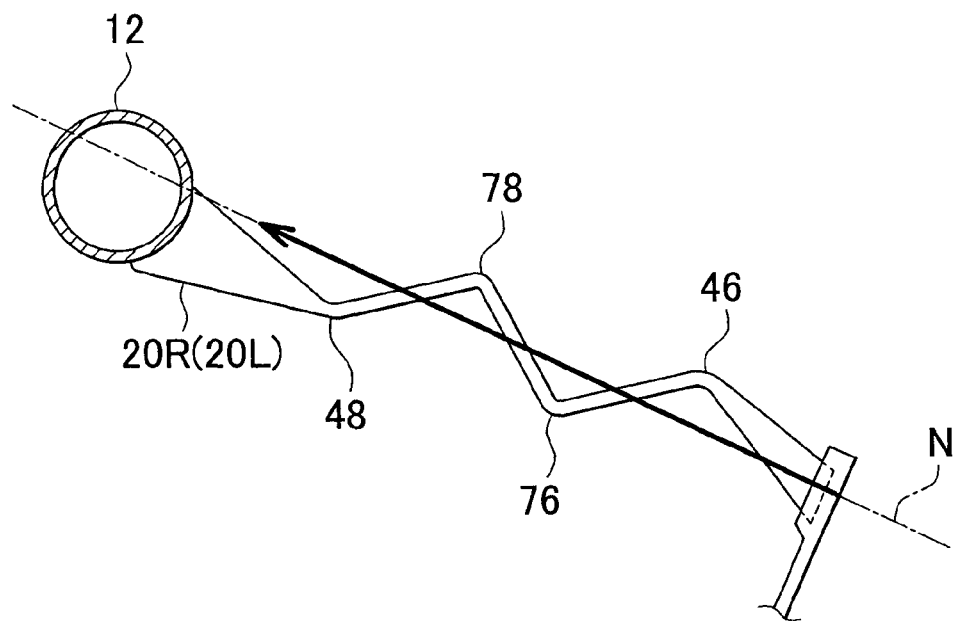
FIG. 9 is a view illustrating a modification example of the upper bracket in the first example embodiment of the invention.

While the upper brackets 20R and 20L are each formed to bend at two points, that is, the first crease 46 and the second crease 48 in the first example embodiment, the invention is not limited to this. For example, additional creases 76 and 78 may be further formed at each of the upper brackets 20R and 20L such that one of each two longitudinally adjacent creases, among the four creases 46, 48, 76, and 78, is above the normal N while the other is below it, as shown in FIG. 9. In this case, the upper brackets 20R and 20L each bend at the four points. Note that the number of creases may be changed as needed.

Further, while the attachment portions of the knee airbag module 50 via which it is fixed to the right knee panel 24R and the left knee panel 24L, respectively, are provided both on the upper and lower sides of the lower ends of the respective lower brackets 22R and 22L in the first example embodiment, the arrangement of the same attachment portions may be changed as needed. Further, the knee airbag module 50 may be directly fixed to the lower brackets 22R and 22L.

Hereinafter, the second example embodiment of the invention will be described. The structural elements and effects of the second example embodiment that are basically the same as those of the first example embodiment will be denoted by the same reference numbers, and their descriptions will be omitted.

Figure 10:
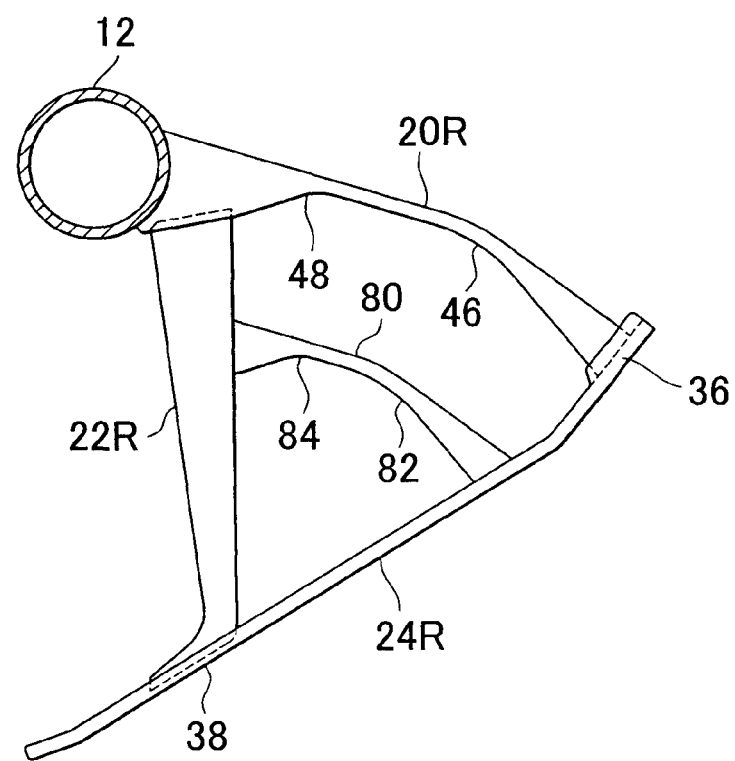
FIG. 10 is a view showing the structure of a part of a vehicle occupant knee protection apparatus of the second example embodiment of the invention.

FIG. 10 is a longitudinal sectional view of the structure of a part of a vehicle occupant knee protection apparatus of the second example embodiment of the invention. Note that FIG. 10 corresponds to FIG. 2 for the first example embodiment. The structure of the vehicle occupant knee protection apparatus of the second example embodiment is basically the same as that of the first example embodiment, however it does not have the knee airbag module 50 and it additionally has an intermediate bracket 80.

The structure of the intermediate bracket 80 is basically the same as that of the right upper bracket 20R, having a first crease 82 and a second crease 84 corresponding, respectively, to the first crease 46 and the second crease 48 of the right upper bracket 20R. The front end of the intermediate bracket 80 is fixed to a vertically intermediate portion of the right lower bracket 22R, while the rear end is fixed to a vertically intermediate portion of the right knee panel 24R (i.e., a portion between the upper attachment portion 36 and the lower attachment portion 38). The rear end of the intermediate bracket 80 is arranged at such a position that it is opposed, from the front side of the vehicle, to the corresponding knee of the occupant seated on the driver's seat if the occupant is of a build smaller than the average build (e.g., a build corresponding to AF05). Although not shown in the drawings, another intermediate bracket identical to the intermediate bracket 80 is provided between the left lower bracket 22L and the left knee panel 24L.

According to the second example embodiment, when the right knee of an occupant of a build smaller than the average build (e.g., a build corresponding to AF05) hits against the right knee panel 24R, the intermediate bracket 80 bends at the first crease 82 and the second crease 84 (in the same manner as the right upper bracket 20R bends) while the front end of the intermediate bracket 80 is supported by the right lower bracket 22R having a high rigidity. In this way, the knees of the occupant can be protected. According to the second example embodiment, that is, the cost can be reduced by removing the knee airbag module 50 while ensuring a sufficient performance for protecting the knees of small occupants using the intermediate bracket(s) 80. As such, many parts can be shared between the second example embodiment having no knee airbag and the first example embodiment having the knee airbag.

While the height H (section modulus) of the perpendicular walls 28 and 30 of the right upper bracket 20R (the left upper bracket 20L) gradually decreases on one side and gradually increases on the other side in the longitudinal direction of the right upper bracket 20R (the left upper bracket 20L) such that the first crease 46 and the second crease 48 are formed at the right upper bracket 20R (the left upper bracket 20L) in the foregoing example embodiments, such creases may be formed by forming notches, or the like, at each upper bracket.

Further, while multiple creases (i.e., the first creases 46, the second creases 48, etc.) are arranged such that one of each two longitudinally adjacent creases, among the multiple creases, is above the normal N while the other is below it in the foregoing example embodiments, the locations, relative to the normal N, of the respective creases may be changed as needed.

Further, the thickness of the plate from which the right lower bracket 22R is made is larger than the thickness of the plate from which the upper brackets 20R and 20L are each made so that the right lower bracket 22R is higher in rigidity than the upper brackets 20R and 20L in the foregoing example embodiments. Alternatively, for example, the rigidity of such a lower bracket may be made higher than that of an upper bracket(s) by making them of different materials.

Further, while the left lower bracket 22L is connected to the floor brace 16 via the connection bracket 32 in the foregoing example embodiments, the connection bracket 32 may be omitted and a lower bracket identical to the right lower bracket 22R may be used in place of the left lower bracket 22L.

Further, while the upper brackets 20R and 20L are each formed to have a generally U-shaped section of which the opening faces downward in the foregoing example embodiments, they may alternatively be formed to have a generally U-shaped section of which the opening faces upward.

Further, while the vehicle occupant knee protection apparatuses of the foregoing example embodiments are each applied to right-hand vehicles, they may be applied also to left-hand vehicles.

The invention has been described with reference to the example embodiments for illustrative purposes only. It should be understood that the description is not intended to be exhaustive or to limit form of the invention and that the invention may be adapted for use in other systems and applications. The scope of the invention embraces various modifications and equivalent arrangements that may be conceived by one skilled in the art.

The invention claimed is:

1. A vehicle occupant knee protection apparatus comprising:
  a knee panel to which load is input upon a collision of a vehicle;
  a lower bracket of which a lower end is fixed to a lower end portion of the knee panel;
  an upper bracket of which a rear end is fixed to an upper end portion of the knee panel and at which multiple creases that are to be bent in response to the load being input are provided in a longitudinal row; and
  a knee airbag module that is arranged near a portion, at a side where the lower bracket is present, of the knee panel and that is fixed to the knee panel, wherein
    an upper end of the lower bracket is fixed to a front end portion of the upper bracket and a front end of the upper bracket is fixed to an instrument panel reinforcement;
    an attachment portion of the knee airbag module via which the knee airbag module is fixed to the knee panel is located higher than the lower end of the lower bracket; and
    another attachment portion of the knee airbag module via which the knee airbag module is fixed to the knee panel is located lower than the lower end of the lower bracket.

2. The vehicle occupant knee protection apparatus according to claim 1, wherein the multiple creases are arranged to be longitudinally adjacent to each other such that one of the adjacent creases is located above a normal to the knee panel drawn through a longitudinal center of a portion to which the upper bracket is fixed, while the other of the adjacent creases is located below the normal.

3. The vehicle occupant knee protection apparatus according to claim 2, wherein:
  the multiple creases include a first crease and a second crease that is closer to the instrument panel reinforcement than the first crease is; and
  a section modulus of the upper bracket gradually decreases from a knee panel side end toward the first crease, and gradually decreases from an instrument panel reinforcement side end toward the second crease.

4. The vehicle occupant knee protection apparatus according to claim 3, wherein:
  the upper bracket is generally U-shaped in section, opening downward and having perpendicular walls extending downward; and
  heights of the respective perpendicular walls vary, thus accomplishing the decreases in the section modulus.

5. The vehicle occupant knee protection apparatus according to claim 1, wherein the lower bracket is higher in rigidity than the upper bracket.

* * * * *